United States Patent
Olsen

[15] 3,678,777
[45] July 25, 1972

[54] ENERGY ABSORBING STEERING CONTROL SYSTEM

[72] Inventor: Ralph A. Olsen, Grosse Pointe Woods, Mich.

[73] Assignee: Ford Motor Company, Dearborn, Mich.

[22] Filed: Nov. 16, 1970

[21] Appl. No.: 89,890

[52] U.S. Cl.............................................74/492, 280/150 B
[51] Int. Cl..........................................................B62d 1/18
[58] Field of Search.........................74/492, 493; 280/150 B

[56] References Cited

UNITED STATES PATENTS 3,487,710  1/1970  Fergle......................................74/492
3,545,300  12/1970  Furusho..................................74/492

*Primary Examiner*—Milton Kaufman
*Attorney*—John R. Faulkner and Clifford L. Sadler

[57] ABSTRACT

An energy absorbing steering column for a motor vehicle having a tubular jacket with a plastically deformable, bendable section. The column is constructed to absorb energy by angularly displacing the upper column portion and buckling the bendable section when an impact force is exerted on the steering wheel.

10 Claims, 4 Drawing Figures

Patented July 25, 1972  3,678,777

INVENTOR.
RALPH A. OLSEN
BY John R. Faulkner
Clifford L. Sadler

Patented July 25, 1972

INVENTOR.
RALPH A. OLSEN
BY John R. Faulkner
Clifford L. Sadler
ATTORNEYS

3,678,777

ENERGY ABSORBING STEERING CONTROL SYSTEM

BACKGROUND OF THE INVENTION

The present invention relates to collapsible steering columns for motor vehicles, and more particularly to the the type of steering column construction that is designed to absorb energy by controlled deformation of the column components when an impact load is exerted against its steering wheel end.

BRIEF SUMMARY OF THE DISCLOSURE

In accordance with the presently preferred embodiment of this invention, a steering column is supported from vehicle body structure, such as the instrument panel of a motor vehicle, by means of a bracket. The tubular outer housing or jacket of the column is formed with a weakened section situated adjacent to the support bracket. The column portion above the support bracket is constructed to be angularly displaced when an impact load is imposed upon the steering wheel thereby causing the weakened section to buckle. The plastic deformation resulting from the buckling absorbs the impact load.

The steering shaft within the column has a universal joint concentric with respect to the weakened section in the housing. The shaft is enclosed within a transmission shift tube which also has a bendable portion. The shift tube and steering shaft are designed to buckle when the housing is angularly displaced under an impact load.

BRIEF DESCRIPTION OF THE DRAWINGS

The many objects and advantages of the present invention will become apparent from the following discussion and the accompanying drawings, in which.

DETAILED DESCRIPTION OF THE PREFERRED EMBODIMENT

Figure 1:
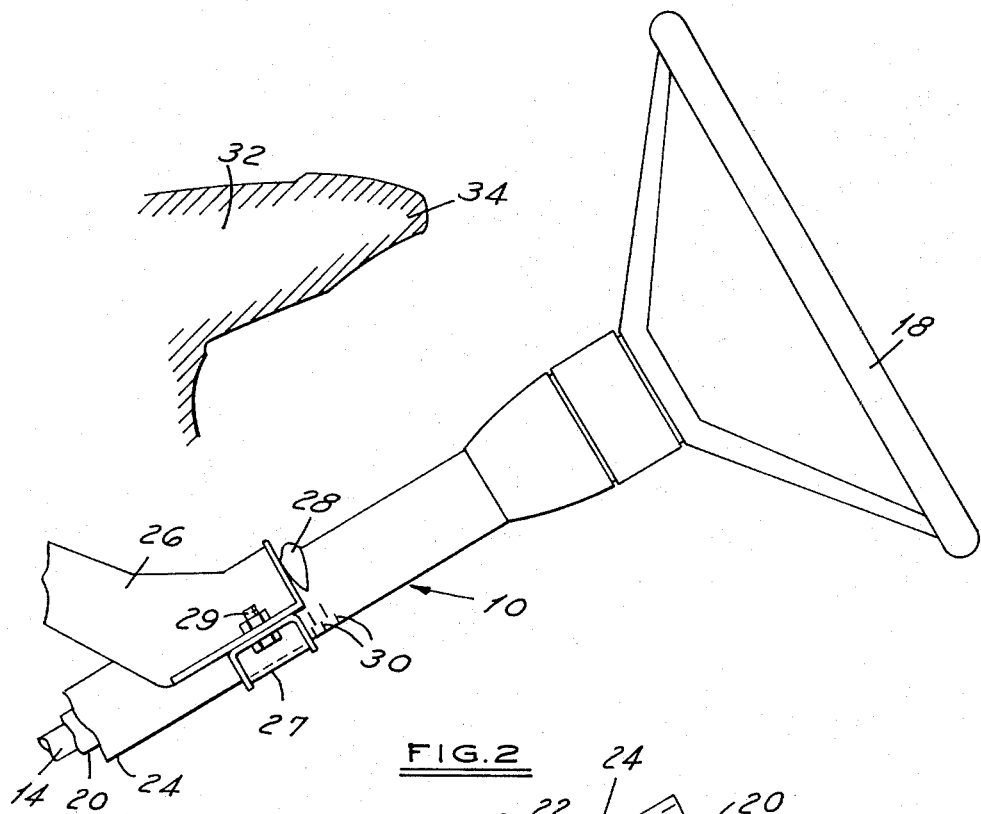
FIG. 1 is a side elevational view of an energy absorbing steering column constructed in accordance with the present invention.
Figure 2:
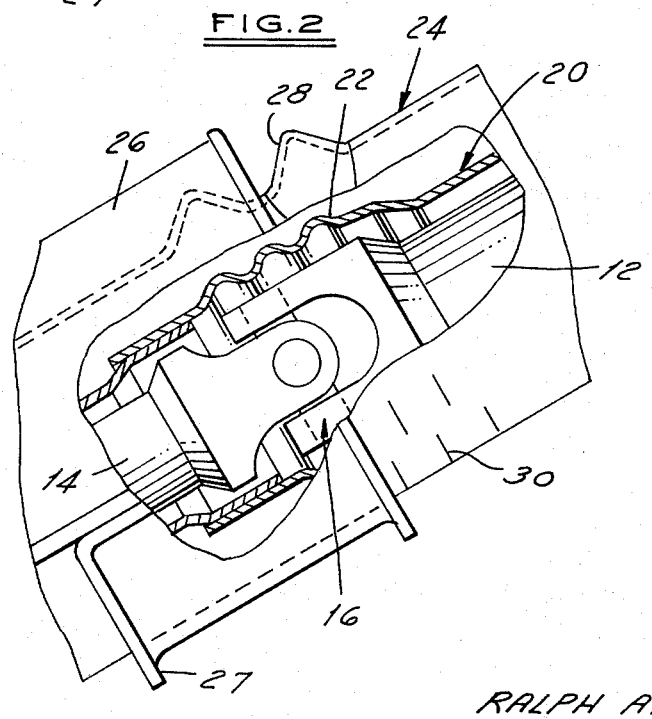
FIG. 2 is an enlarged view, partly in section, of a portion of the steering column of FIG. 1.

Referring now to the drawings wherein the presently preferred embodiment of this invention is illustrated, FIG. 1 discloses a steering column 10 for a motor vehicle.

The column 10 is an assembly comprising an upper steering shaft section 12 and a lower steering shaft section 14 that are interconnected by a universal joint 16. The shaft section 12 is connected to a steering wheel 18 at its upper end. The lower end of the lower steering shaft section 14 is constructed to be connected to a steering gear. The steering shaft sections 12 and 14 are rotatably supported for the transmission of torque from the steering wheel 18 to the steering gear.

A transmission shift tube 20 surrounds the steering shaft sections 12 and 14. The shift tube 20 is connected to a transmission selector lever at its upper end. The lever is disposed adjacent to the steering wheel 18 within convenient reach of the vehicle operator. The lower end of the shift tube 20 is constructed to be connected to the vehicle transmission by a linkage system. The shift tube 22 is rotatably supported to transmit movement from the shift lever to the shift linkage connected to the lower end of the tube.

The tube 20 is formed with a series of convolutions 22 that are concentrically disposed with respect to the universal joint 16. The convolutions 22 are designed to reduce the bending strength of the tube 20 in the localized area in which they are located.

A rigid tubular jacket or housing 24 surrounds the steering shaft assembly 12, 14 and the shift tube 22 which are rotatably supported therein. The tubular housing 24 is secured to a bracket 26 by a semi-circular clamp 27 and a set of bolts 29. The bracket 26 is affixed to vehicle body structure. It will be noted from FIG. 1 that the upper end of the steering column 10 extending beyond the bracket 26 is supported in cantilever fashion.

The tubular housing 24 is provided with a section having reduced bending strength. For this purpose, the housing 24 is provided with a plurality of convolutions 28 on its upper surface and a plurality of slits 30 in its lower side. The convolutions 28 and slits 30 are disposed adjacent to the bracket 26 and clamp 27.

In FIG. 1, an instrument panel 32 of a motor vehicle is disposed adjacent to the steering column 10. The instrument panel has a deformable portion 34 that is constructed to absorb energy when struck by an impact load.

OPERATION

Figure 3:
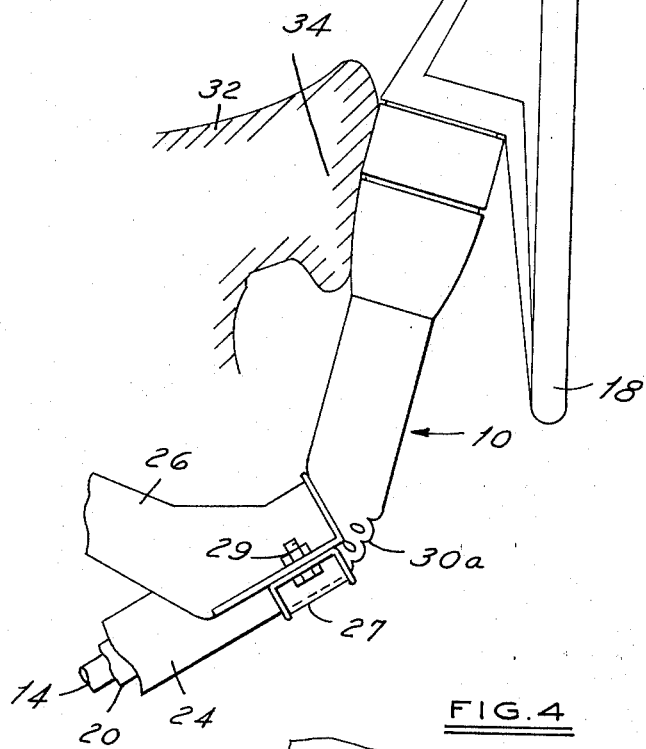
FIG. 3 discloses the configuration of the steering column of FIG. 1 after an impact load has been imposed upon the steering wheel and upper end of the column.
Figure 4:
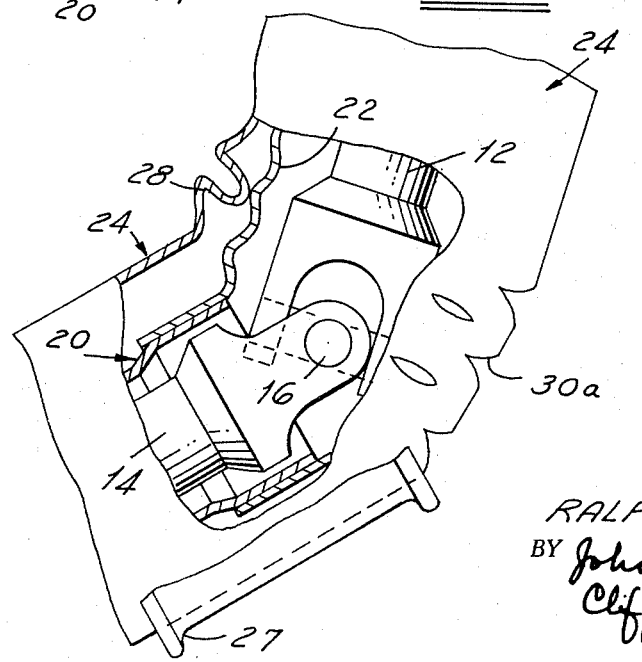
FIG. 4 is an enlarged view, partly in section, showing a portion of the deformed steering column of FIG. 3.

Under an impact load the steering column of FIG. 1 will be deformed into the configuration of FIG. 3. Assuming an impact upon the lower rim of the steering wheel 18 that is above a preset minimum, the column 10 will be angularly displaced in a pivotal manner with the bendable portions of the shift tube 20 and tubular housing 24 forming the pivot center for the angular movement. As seen in FIG. 4, the convolutions 28 of the tubular housing 24 will buckle and collapse. As the upper section of the steering column 10 is bent upwardly and forwardly, the slits 30 are expended to form open slots 30a. The plastic deformation of the metal of the housing 24, which occurs when the convolutions 28 collapse and the slits 30 expand, absorbs the energy of the impact load upon the steering wheel 18.

Energy is also absorbed in the distortion of the shift tube 20. The convolutions 22 are plastically deformed by the angular displacement of the steering column. It is to be noted that the universal joint 16 is in concentric alignment with the bendable sections of the shift tube 20 and the tubular housing 24. This construction permits the steering shaft assembly 12, 14 to pivot at the joint 16 when the tube 20 and housing 24 buckle.

In an alternate embodiment of the present invention, the upper and lower shafts 12 and 14 may be connected by a reduced diameter section that would permit the shaft assembly to bend with the column.

As seen in FIG. 3, maximum angular displacement of the upper portion of the steering column 10 brings it into engagement with the energy absorbing portion 34 of the vehicle instrument panel 32. Distortion of the portion 34 of the instrument panel provides an additional means for absorbing the energy imposed upon the steering column 10 as a result of an impact.

SUMMARY

In accordance with the present invention, a steering column construction is provided which collapses upon impact to absorb energy. A distinctive feature of a column constructed in accordance with this invention is the fact that energy is absorbed by plastic deformation of the column structure in a bending mode. This construction has the advantage that it will absorb energy imposed upon the steering wheel from a wide variety of directions.

The foregoing description presents the presently preferred embodiment of this invention. Modifications and alterations of the invention may occur to those skilled in the art which will come within the scope and spirit of the following claims.

I claim:

1. An energy absorbing steering column for a motor vehicle having a rotatable steering shaft means, a steering wheel connected to said shaft means, said shaft means being constructed to be connected to a steering gear, a tubular housing surrounding said shaft meanS, bracket means engaging said tubular housing at a location spaced from said steering wheel and constructed to support said tubular housing on vehicle body structure, the upper portion of said housing between said bracket means and said steering wheel being unsupported by means exterior of said housing, said housing having an energy absorbing section disposed above said bracket means, said section having a lower strength than the adjacent portion of said upper portion, said section being constructed to absorb energy by plastic deformation when an impact force above preset minimum is imposed upon said steering wheel whereby said upper portion of said housing is angularly displaced.

2. An energy absorbing steering column for a motor vehicle according to claim 1 and including;
a transmission shift tube surrounding said steering shaft means, said tube being constructed to be connected at one of its ends to a shift lever adjacent said steering wheel and to a vehicle transmission at the other of its ends, said tube having an energy absorbing section generally concentrically disposed with respect to the energy absorbing section of said housing, said tube section having a lower strength than the adjacent portion of said tube and being constructed to absorb energy by plastic deformation.

3. An energy absorbing steering column for a motor vehicle according to claim 2 and including:
said energy absorbing section of said tube and said housing being integral with the main portion of said tube and said housing, respectively.

4. An energy absorbing steering column for a motor vehicle having a steering shaft means, a steering wheel connected to said shaft means, said shaft means being constructed to be connected to a steering gear, a tubular housing surrounding said shaft means, bracket means engaging said tubular housing at a location spaced from said steering wheel and constructed to support said tubular housing on said vehicle, the upper portion of said housing between said bracket means and said steering wheel being unsupported by means exterior of said housing, said housing having an energy absorbing bendable section disposed adjacent said bracket means, said bendable section being situated above the location where said bracket means engages said housing, said bendable section having a lower bending strength than the adjacent portion of said upper portion, said bendable section being constructed to absorb energy by plastic deformation when an impact force above a preset minimum is imposed upon said steering wheel whereby said upper portion of said housing is angularly displaced.

5. An energy absorbing steering column for a motor vehicle according to claim 4 and including:
said bendable section comprising convolutions formed in the wall of said housing.

6. An energy absorbing steering column in a motor vehicle having a steering shaft means, a steering wheel connected to said shaft means, said shaft means being constructed to be connected to a steering gear, a tubular housing surrounding said shaft means, bracket means engaging said tubular housing at a location spaced from said steering wheel and constructed to support said tubular housing on said vehicle, the upper portion of said housing between said bracket means and said steering wheel being unsupported by means exterior of said housing, said housing having an energy absorbing bendable section disposed adjacent said bracket means, said bendable section having a lower bending strength than the adjacent portion of said upper portion, said bendable section being constructed to absorb energy by plastic deformation when an impact force above a preset minimum is imposed upon said steering wheel whereby said upper portion of said housing is angularly displaced, vehicle body structure including deformable energy absorbing means spaced from said tubular housing, said upper portion of said steering column being constructed to engage said energy absorbing portion of said body structure when said housing is angularly displaced.

7. An energy absorbing steering column for a motor vehicle including a steering shaft means, said shaft means comprising an upper shaft section, a lower shaft section, joining means joining said shaft sections, a steering wheel connected to said upper shaft section, said lower section being constructed to be connected to a steering gear, a transmission shift tube surrounding said steering shaft means, said tube being constructed to be connected at one of its ends to a shift lever adjacent said steering wheel and to a vehicle transmission at the other of its ends, a tubular housing surrounding said shaft means and said shift tube, bracket means engaging said tubular housing at a location spaced from said steering wheel and constructed to support said tubular housing on vehicle body structure, the upper portion of said steering column between said bracket means and said steering wheel being unsupported by external means, said housing and said tube having generally concentric energy absorbing bendable sections disposed adjacent said bracket means, said bendable sections having a lower bending strength than said upper portion of said housing and said tube respectively, said bendable sections being generally concentric with respect to said joining means, said bendable sections being constructed to absorb energy by plastic deformation when an impact force above a preset minimum is imposed upon said steering wheel whereby said upper portion of said steering column including said housing, said shift tube, and said upper shaft section are angularly displaced.

8. An energy absorbing steering column for a motor vehicle according to claim 7 and including:
said joining means comprising a universal joint interconnecting said shaft section.

9. An energy absorbing steering column in a motor vehicle including a steering shaft means, said shaft means comprising an upper shaft section, a lower shaft section, joining means joining said shaft sections, a steering wheel connected to said upper shaft section, said lower section being constructed to be connected to a steering gear, a transmission shift tube surrounding said steering shaft means, said tube being constructed to be connected at one of its ends to a shift lever adjacent said steering wheel and to a vehicle transmission at the other of its ends, a tubular housing surrounding said shaft means and said shift tube, bracket means engaging said tubular housing at a location spaced from said steering wheel and constructed to support said tubular housing on said vehicle, the upper portion of said steering column between said bracket means and said steering wheel being unsupported by external meanS, said housing and said tube having generally concentric energy absorbing bendable sections disposed adjacent said bracket means, said bendable sections having a lower bending strength than said upper portion of said housing and said tube respectively, said bendable sections being generally concentric with respect to said joining means, said bendable sections being constructed to absorb energy by plastic deformation when an impact force above a preset minimum is imposed upon said steering wheel whereby said upper portion of said steering column including said housing, said shift tube and said upper shaft section are angularly displaced, vehicle body structure including a defOrmable energy absorbing portion, the upper portion of said steering column being constructed to engage said energy absorbing portion of said body structure when said housing is angularly displaced.

10. An energy absorbing steering column for a motor vehicle according to claim 9 and including:
said joining means comprising a universal joint interconnecting said shaft sections, said bendable section of said housing being formed with a plurality of convolutions, said bendable section of said shift tube being formed with a plurality of convolutions.

* * * * *